United States Patent [19]

Graham

[11] 4,130,363

[45] Dec. 19, 1978

[54] LASER DUMMY LOAD

[76] Inventor: Danny Graham, Rte. 1, Box 15, Alamogordo, N. Mex. 88310

[21] Appl. No.: 758,514

[22] Filed: Jan. 11, 1977

[51] Int. Cl.² ............................ G01J 1/40; G01J 1/42
[52] U.S. Cl. ...................................... 356/225; 356/234
[58] Field of Search ..................... 356/225, 234, 103; 250/228, 237

[56] References Cited

U.S. PATENT DOCUMENTS

| 2,111,585 | 3/1938 | Falge | 356/225 |
| 2,203,761 | 6/1940 | Williams | 250/237 |
| 2,957,085 | 10/1960 | Faulhaber | 356/225 |
| 2,984,747 | 5/1961 | Walker | 250/228 |
| 3,575,048 | 4/1971 | DeBenedictis | 356/234 |
| 3,630,617 | 12/1971 | Marrett | 356/103 |
| 3,639,065 | 2/1972 | Rothrock et al. | 356/225 |

Primary Examiner—John K. Corbin
Assistant Examiner—Stewart Levy
Attorney, Agent, or Firm—Nathan Edelberg; Robert P. Gibson; Saul Elbaum

[57] ABSTRACT

A hollowed frusto-conical member has its base mounted adjacent the output of a laser. The apex portion extends outwardly from the laser output. The design of the member causes laser light to reflect many times as it travels from the base at a large aperture of the member down to the apex or focal point. The member may be made from light absorbing plastic material which absorbs most of the laser light and reflects only an infinitesimal portion.

10 Claims, 4 Drawing Figures

LASER DUMMY LOAD

RIGHTS OF THE GOVERNMENT

The invention described herein may be manufactured, used, and licensed by or for the United States Government for governmental purposes without the payment to me of any royalty thereon.

FIELD OF THE INVENTION

The present invention relates to light absorbing devices, and more particularly, to a laser energy absorption device to be placed over laser output optics.

BRIEF DESCRIPTION OF THE PRIOR ART

Prior techniques require wearing protective goggles while analyzing laser parameters. This creates a safety problem in that goggles reduce luminous transmittance (visibility) by about 80% for certain wavelengths (materials).

There are frequent instances when goggles are detrimental as when working on the laser high voltage power supply or trying to view and photograph short duration laser pulses (~ 20 nanoseconds) on oscilloscope displays. Goggles tend to block out or attenuate specific colors. Warning lights or binary code indicator lights on accessory test equipment are therefore difficult to see.

These problems create a hazard because people tend to neglect safety requirements in order to get the job done and do not wear goggles or they tend to cover the laser output optics with nearby and convenient objects. Such covers can leak excessively, creating an eye hazard and also can reflect laser light rays into the laser optics. This reflected energy can be focused by the laser to a small spot on delicate optics such as mirrors, prisms, Q-switches and even the lasing rod. The burning effect can damage the laser extensively.

BRIEF DESCRIPTION OF THE PRESENT INVENTION

The aforementioned problems are mitigated by utilizing the present invention. When the invention is used properly, goggles need not be worn.

The concept here is that of the fabrication of a lightweight Laser Dummy Load which fits tightly over the output optics, absorbs the laser energy due to multiple reflections simulating a black body absorber and prevents parallel return reflections from damaging any optics.

Leakage is eliminated and a photo diode detector mounted inside the Dummy Load monitors pulse shape and power output.

The inside is coated with absorption material required for particular laser wavelengths. The mounting is adaptable to virtually all lasers.

Efficiencies approaching 100% absorption can be achieved by varying the physical size of the Dummy Load.

Installation is simple and is accomplished in minimum time.

DETAILED DESCRIPTION OF THE INVENTION

Figure 1:
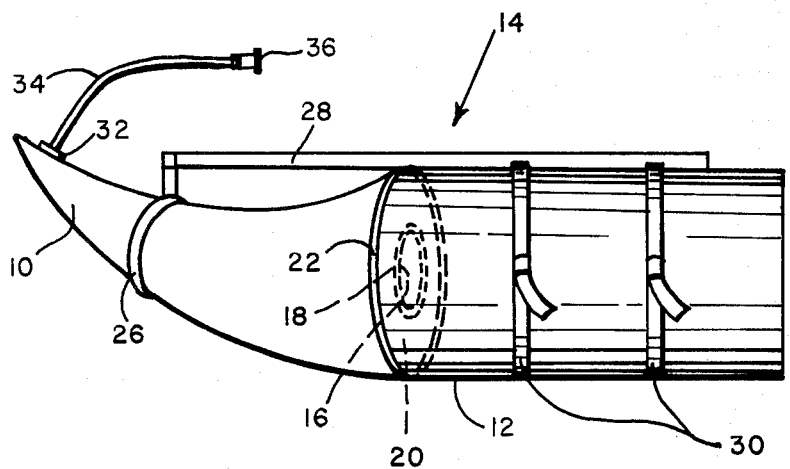
FIG. 1 is a side view illustrating a first embodiment of the invention, namely, a laser dummy load of horn-shape attached to the output port of a laser.

The above-mentioned objects and advantages of the present invention will be more clearly understood when considered in conjunction with the accompanying drawings, in which:

Referring to the figures, and more particularly FIG. 1 thereof, a first embodiment of the invention shown in a horn-shaped form is indicated by reference numeral 10. The base or aperture of the dummy load is maintained in abutment with the output port of laser housing 12. A mounting bracket generally indicated by 14 is shown to position the laser dummy load against the output port of the laser housing. The output port of the laser housing is indicated as 16 and, as will be seen, the aperture or admittance opening for the laser dummy load is slightly larger at 18. The aperture 18 is formed in a base or aperture plate 20 of the dummy load. An apppropriate light seal 22 should seal the interface between the aperture plane 20 and the confronting surface of laser housing 12.

A simple means for mounting the dummy load to the laser housing is illustrated. The mounting bracket includes a collar 26 which secures a first end of the dummy load and is connected to the bracket 28, which has an opposite end secured to the laser housing by means of straps 30. It is to be emphasized that the mounting means is merely illustrative of a simple mounting means.

In order to monitor the light energy conditions within the horn-shaped dummy load 10, a photodetector 32 of conventional design is suitably mounted to the mounting bracket 14 so that light impingement onto the photodectector 32 occurs within the mounting bracket 14. As an example of a proper placement position of the photodetector, the point of intersection of maximum ray traces has been determined to be a satisfactory point. At this point, the ray trace conditions may be monitored by connecting the photodiode 32 to an electrical connector 36 via a cable 34. The connector 36 may then be appropriately connected to an oscilloscope.

Figure 2:
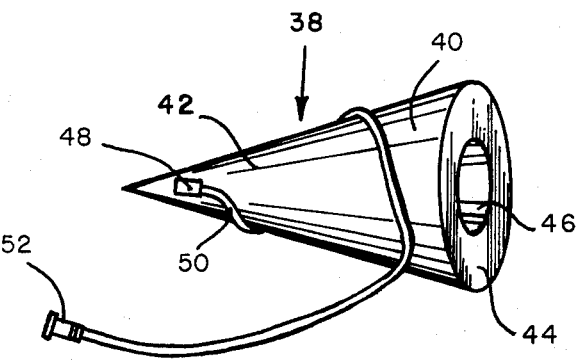
FIG. 2 is a perspective view of a second embodiment of the invention having a conical shape.

FIG. 2 illustrates a second embodiment of the invention which is in the form of a hollowed cone 38. The cone includes a conical surface 40 that extends between an annular or aperture baseplate 44 to a narrowed apex portion 42. The aperture or inlet port 46 in the base 44 admits entry of laser energy from a laser housing such as 12 in FIG. 1.

As in the case of the embodiment of FIG. 1, a photodetector 48 is mounted to the cone 38 so that light energy may be monitored in the apex portion of the cone where maximum ray trace intersection occurs. A cable 50 is located on the exterior of the cone 38 and terminates in an electrical connector 52 that may be connected to a monitoring device such as an oscilloscope as was the case in connection with the embodiment of FIG. 1.

A third embodiment of the present invention is in the form of a cylinder 54 which has an annular or apertured end 56. The opening 58 in this end serves as the inlet port for laser light that would be admitted from a laser housing such as 12 in FIG. 1. Within the interior of the cylinder 54 are raised projections 68 that are comprised from light absorbing material. In this respect, the projections 68 serve an energy absorbing function as is the case in anechoic chambers wherein sound absorbing material is formed in frusto-conical projections to disperse and absorb sound waves.

Figure 3:
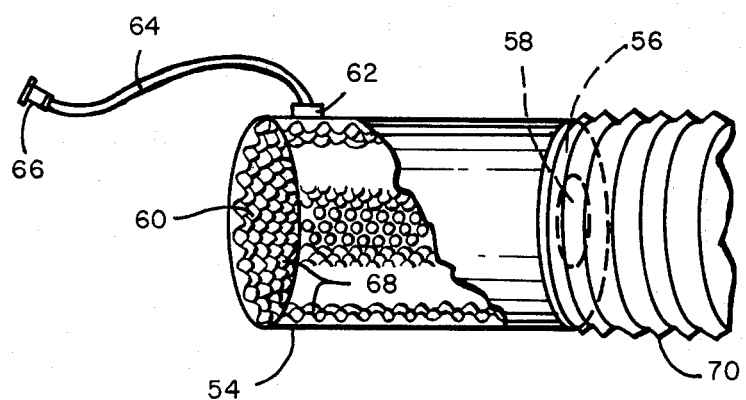
FIG. 3 is a perspective view of a third embodiment of the present invention having a cylindrical shape.

As in the previous instances, a photodetector is mounted to the body of the laser dummy load as shown at 62. The cable 64 and connector 66 serve the monitoring function as previously outlined. The cylinder end 60 would normally reflect laser light energy back into the optics of a laser housing. However, the inclusion of the projections 68 on the far end of the cylinder 54 prevents this from happening. In the case of the cylinder depicted in FIG. 3, it will be noticed that a bellows 70 is included between the inlet end 56 of the cylinder 54. The opposite end is adapted to be attached to a laser housing 12 such as shown in FIG. 1. The bellows 70 illustrates a type of light gasket or seal that may be employed between a laser housing and a dummy load.

Figure 4:
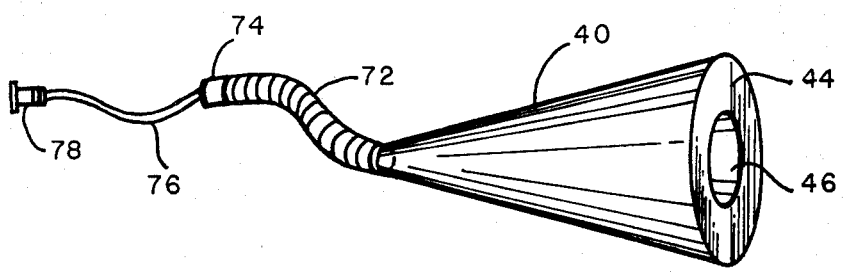
FIG. 4 is a perspective view of a fourth embodiment of the present invention having a truncated conical member communicating with a flexible laser energy attenuating tube.

FIG. 4 illustrates another version of the invention. In the event that the output from a laser is extremely high and the inclusion of a photodetector in the dummy load itself would ruin the detector, a length of flexible tubing 72, communicating with an opened apex portion of a dummy load, would attenuate the light passing from the dummy load to a removed photodetector 74, via the tubing 72. The amount of flexing would affect the light attenuation received by the photodetector 74. An electrical cable 76 and connector 78 again permits the monitoring of the laser light output as detected by the photodetector 74. It is to be understood that the use of a truncated cone as shown in FIG. 4 does not limit the use of the attenuation tube 72 to other shapes of dummy loads such as the embodiment shown in FIG. 3 and FIG. 1.

Although as will be recognized, the concept of the present dummy load may be applied to various shapes including a wide variety of frusto-conical shapes, there are a number of design considerations that should be mentioned. For example, the input or inlet aperture for the dummy load should be at least as large or larger than the output port of a laser. This will reduce the light leakage between these two members. Further, the longer a dummy load member is, the more beneficial the performance should be due to the greater degree of reflection and absorption of laser light within the dummy load.

In the event that the intensity of laser light energy is a bit too high for the photodetector, the latter-mentioned member may be angled with respect to impinging light so that the amount of laser light energy actually experienced by the photodetector is lessened.

Each of the embodiments illustrated in FIGS. 1–4 may be made from an appropriate light absorption material such as the material provided in sheet form by Glendale Optical Company of Woodbury, Long Island. In the case of the conical dummy load, the sheet material may be twisted in the form of a cone and the seams may be cemented with an appropriate cement such as of the acrylic type. Further, it should be mentioned that carbon black may be utilized as a proper light-absorbing material to line the laser dummy load.

It should be understood that the invention is not limited to the exact details of construction shown and described herein for obvious modifications will occur to persons skilled in the art.

I claim:

1. A laser dummy load comprising:
   a generally frusto-concical hollowed member fabricated from laser energy absorptive material;
   means for attaching the member to a laser housing;
   means for detecting laser energy signals within the member; and
   means for connecting the detecting means to an apex portion of the member and for preventing direct reflection of the incident laser light energy back to the laser housing.

2. The subject matter set forth in claim 1 wherein the member is conically shaped.

3. The subject matter set forth in claim 1 wherein the member is horn shaped.

4. The subject matter set forth in claim 1 together with a coating deposited on the interior surface of the member for increasing laser energy absorption.

5. Subject matter set forth in claim 1 wherein the detecting means is a photo-responsive solid state component, and cable means are connected to the component for feeding laser energy signals to a utilization device.

6. The subject matter set forth in claim 1 wherein said connecting and reflection preventing means comprises an extension means mounted at a first end thereof to the apex portion, the detecting means located at a second end of the extension means, and communicating with the interior of the apex portion for attenuating the laser energy to be detected.

7. The subject matter set forth in claim 1 with projecting means located inside the member for increasing laser energy absorption.

8. The subject matter set forth in claim 1 wherein said detecting means has only one light incident surface and said connecting and reflection preventing means connects the detecting means to the member with the light incident surface mounted at an acute angle with respect to incident laser light to prevent direct reflection of the incident laser light energy back to the laser housing.

9. The subject matter set forth in claim 1 wherein the member is cylindrically shaped.

10. The subject matter set forth in claim 9 together with projecting means located inside the member for increasing laser energy absorption.

* * * * *